United States Patent [19]

Yabiki et al.

[11] Patent Number: 4,518,989

[45] Date of Patent: May 21, 1985

[54] BUFFER MEMORY DISPERSION TYPE VIDEO/AUDIO TRANSMISSION SYSTEM WITH SPATIALLY AND TIMEWISE DIVIDED INTER-OFFICE JUNCTION LINES

[75] Inventors: Akira Yabiki, Tokyo; Norio Imanishi, Yokohama; Yoji Shibata, Yokohama; Wataru Kosuge, Yokohama; Nobumichi Yukawa, Yokohama, all of Japan

[73] Assignees: Hitachi, Ltd.; Nippon Telegraph & Telephone Public Corporation, both of Tokyo, Japan

[21] Appl. No.: 428,971

[22] Filed: Sep. 30, 1982

Related U.S. Application Data

[63] Continuation of Ser. No. 97,127, Nov. 26, 1979, abandoned.

[30] Foreign Application Priority Data

Nov. 24, 1978 [JP] Japan .................. 53-144159

[51] Int. Cl.³ .................................... H04N 7/10
[52] U.S. Cl. .................... 358/86; 179/2 TV; 358/102; 358/143
[58] Field of Search .............. 358/86, 102, 143; 455/3, 6; 179/1 B, 2 TV; 340/825.02

[56] References Cited

U.S. PATENT DOCUMENTS

| | | | |
|---|---|---|---|
| 3,500,327 | 3/1970 | Belcher | 340/706 |
| 3,587,053 | 6/1971 | Horzepa | 179/2 TV |
| 3,882,538 | 5/1975 | Lowe | 179/1 B |
| 3,936,595 | 2/1976 | Yanagimachi et al. | 358/143 |
| 4,024,345 | 5/1977 | Kochem | 179/1 B |
| 4,251,691 | 2/1981 | Kakihara et al. | 179/2 TV |

OTHER PUBLICATIONS

Haji-Video Response System-VRS-Conf.-ICC 78, 1978 International Conf. on Comm., Toronto, Canada, (4-7 Jun. 1978), pp. 38,3.1-38,3.4.

Primary Examiner—Joseph A. Orsino, Jr.
Attorney, Agent, or Firm—Antonelli, Terry & Wands

[57] ABSTRACT

A video/audio transmission system for sending video and audio information from the video and audio files of a center to a subscriber through a subscriber's junction line is disclosed in which at least one subcenter is disposed near to the subscriber to reduce the number of repeaters arranged on the subscriber's junction line. The subcenters can include a video/audio buffer memory, and exchange and other related circuits. The transmission lines for sending the video and audio information from the center to the sub-center are spatially divided into a plurality of groups in accordance with the sort of the video and audio information being sent, and further the information is time-divisionally transmitted at each group.

14 Claims, 5 Drawing Figures

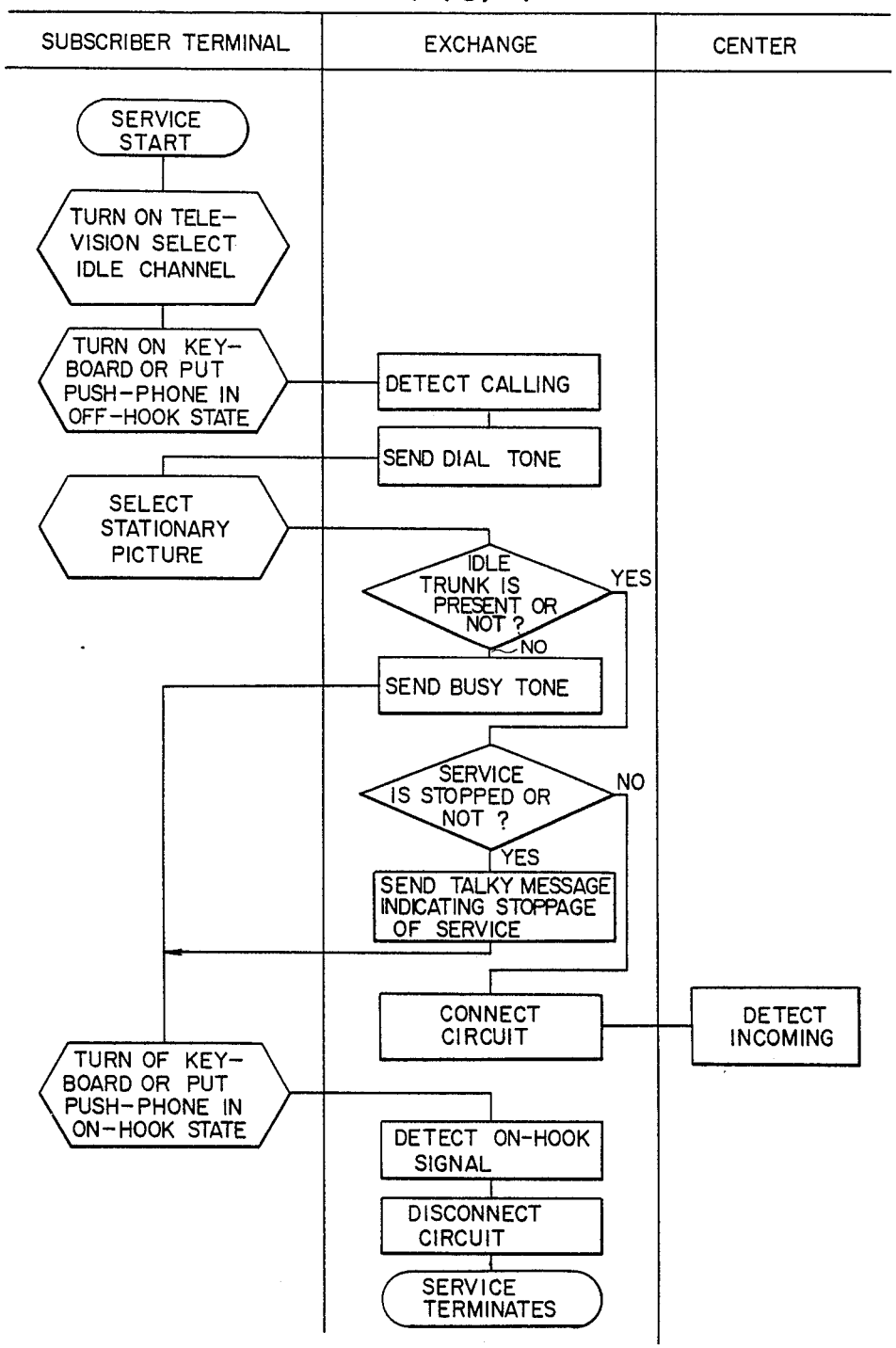

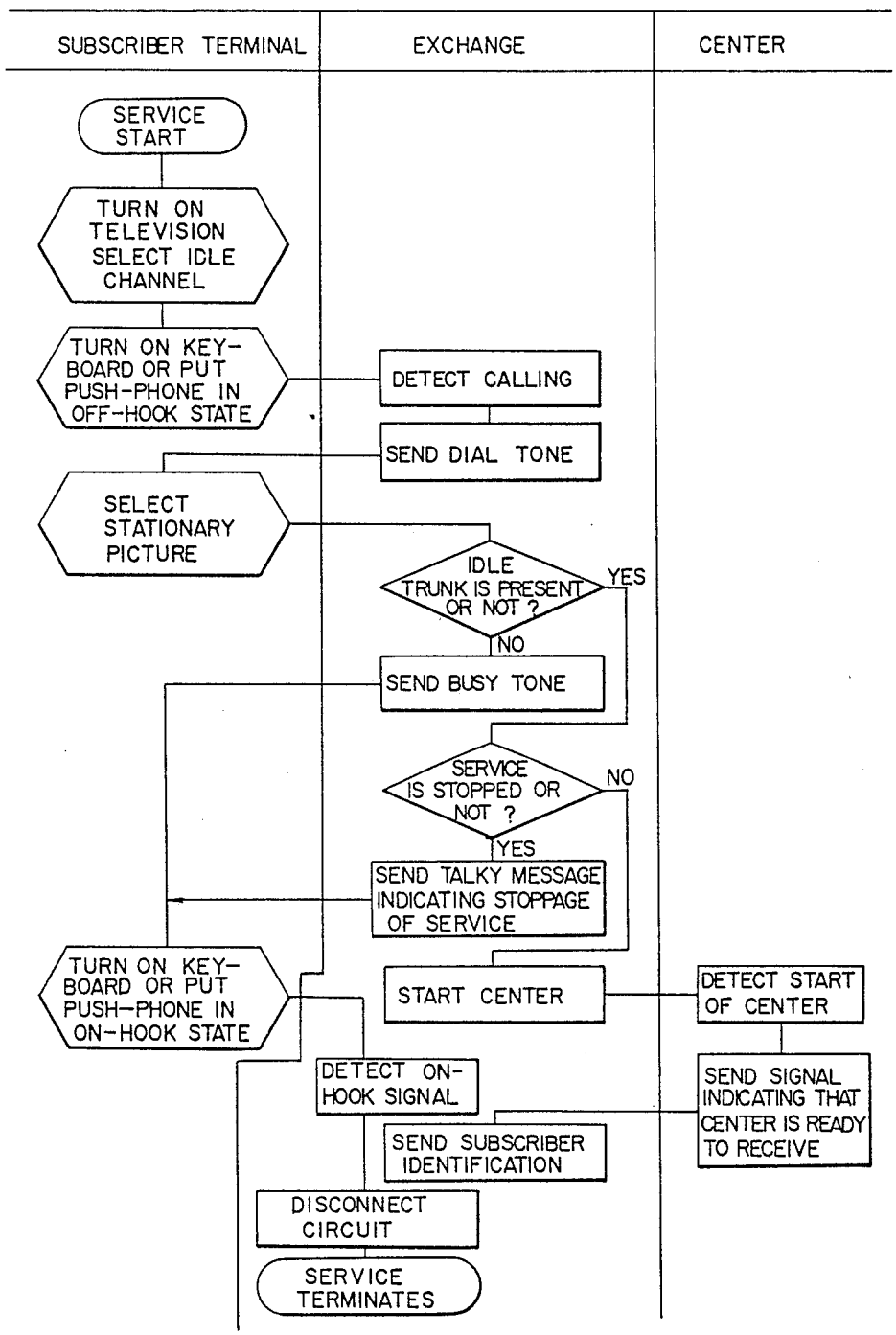

BUFFER MEMORY DISPERSION TYPE VIDEO/AUDIO TRANSMISSION SYSTEM WITH SPATIALLY AND TIMEWISE DIVIDED INTER-OFFICE JUNCTION LINES

This is a continuation of application Ser. No. 097,127 filed Nov. 26, 1979 now abandoned.

The present invention relates to an information service system for providing multiplex information such as picture images and data in which the telephone communication system and the television broadcasting system, which are among the basic media having a nationwide communication network, are combined with each other. More particularly, the present invention relates to a buffer memory dispersion type video/audio transmission system with spatially and timewise divided inter-office junction lines which is a video/audio transmission system provided with sub-centers each including buffer memories and with spatially and timewise divided transmission lines between the center and the sub-centers.

As information is increased in variety and becomes highly-advanced, many countries have spent a great effort to put to practical use an information service system which employs a wide-band, large-capacity communication network and can provide multiplex information such as pictures and data.

For example, the multi-purpose utilization of the broadcasting and telephone networks, each of which provides a basic medium of communication, has been studied. As for the utilization of broadcasting waves, in addition to the character multiplex broadcasting system (TELETEXT) which has been put to practical use in England, the audio multiplex broadcasting system and a character multiplex broadcasting system have been tested in many countries for the purpose of practical use. Further, as for the utilization of the telephone network, the Post Office in England had conducted an examination of an information service system (PRESTEL) for the purpose of practical use and this system has been, enjoying favorable evaluation.

Attempts heretofore made at the multi-purpose utilization of the broadcasting and telephone networks may be classified as follows: (1) Effective utilization of the existing communications networks, (2) Establishment of local, small-scale information service systems for public, and (3) Prevalence of information service systems for exclusive use.

The objects, features and advantages of the present invention will become apparent from the following detailed description of a preferred embodiment thereof taken in conjunction with the accompanying drawings, in which:

FIG. 4 is a flow chart for explaining a service requesting procedure in the case where a subscriber terminal connected to a center requests a stationary picture to the center; and FIG. 5 is a flow chart for explaining a service requesting procedure in the case where a subscriber terminal connected to a sub-center requests a stationary picture to a center.

Figure 1:
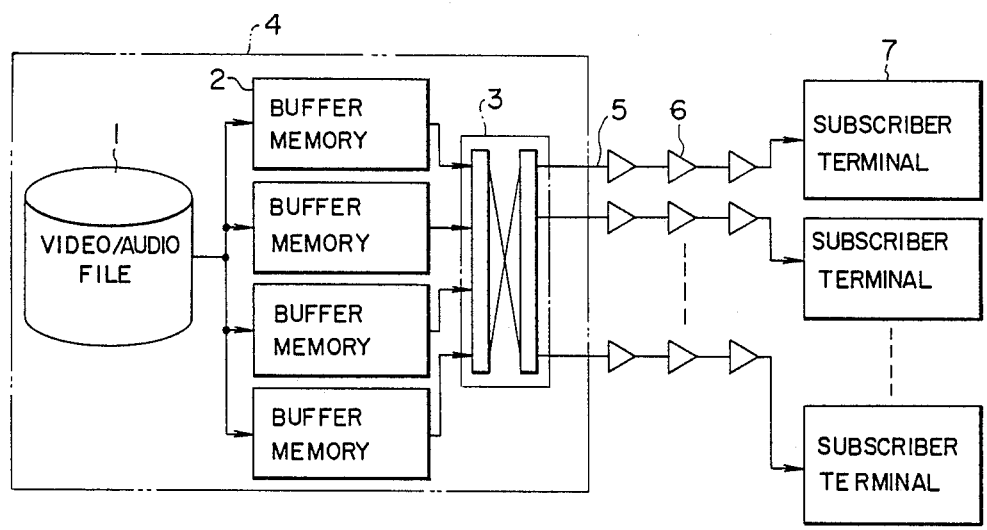
FIG. 1 is a block diagram showing a conventional video/audio transmission network.

According to the conventional center-to-end type video/audio communication system which has been put to practical use, a video/audio transmission network has such a circuit arrangement as shown in FIG. 1 of the accompanying drawings. That is, in a center 4 are installed a video/audio file 1, a video/audio buffer memory 2 and an exchange 3. Further, the center 4 is connected to each of subscriber terminals 7 through a junction line 5 (existing telephone line) which includes a plurality of repeaters 6. Accordingly, when the distance between the center 4 and the subscriber terminal 7 is made long, the number of repeaters 6, which must be provided at intervals of about 500 meters, is increased, and therefore the transmission network becomes expensive.

An object of the present invention is to provide a video/audio transmission system which can overcome the drawbacks of the conventional system and is low in cost.

In order to attain the above object, in a video/audio transmission system according to the present invention, the buffer memories, the exchanges and the like, which have been provided within the center in the conventional system, are moved into sub-centers which are placed near to the subscriber terminals, in order to reduce the length of the subscribers junction line for connecting the exchange to the subscriber terminal. Since the system includes a large number of junction lines, the decrease in length of each junction line can reduce the number of repeaters required, and therefore can reduce the cost of the system to a considerable degree.

Further, it is another object of the present invention to provide a video/audio transmission system in which the number of transmission lines for interconnecting the center to the sub-centers and the number of repeaters are both reduced in a large degree, and besides a video signal and an audio signal are respectively transmitted by a separate transmission line in order to facilitate the maintenance and surveillance of the system.

Figure 2:
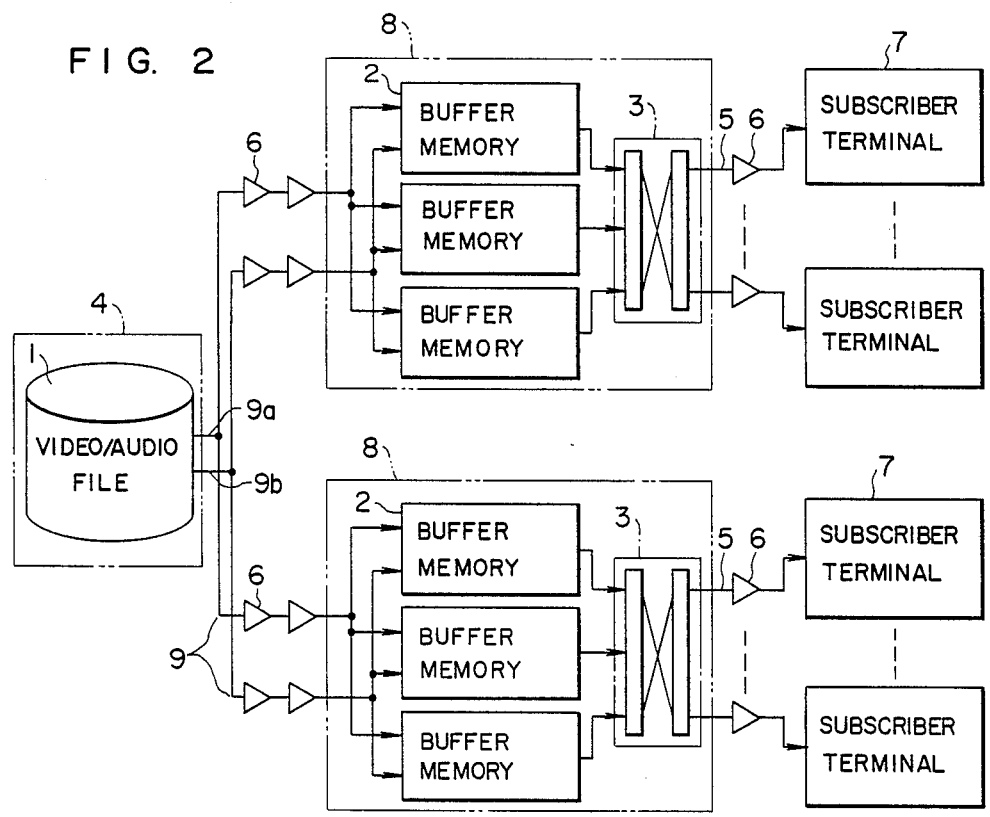
FIG. 2 is a block diagram showing one embodiment of a video/audio transmission network according to the present invention.

The embodiment of the present invention shown in FIG. 2 will be explained below in detail. Referring to FIG. 2, a video/audio file 1 is provided in a center 4, and each of sub-centers 8 includes a buffer memory 2 and an exchange 3. Various signals are transmitted from the center 4 to each sub-center 8 by a plurality of inter-office junction lines 9 in a time/space divisional fashion. For example, the inter-office junction lines are divided into two channels 9a and 9b, one of which transmits a luminance signal and a superimposing signal in a time-divisional fashion and the other channel transmits a chrominance signal and an audio signal in a time-divisional fashion.

Since the sub-center 8 is placed near to a subscriber terminal 7, a subcriber's junction line 5 is short in length. The number of repeaters included in the whole system is proportional to the length of the subscriber's junction line which is large in number. Accordingly, the embodiment shown in FIG. 2 includes a small number of repeaters and is low in cost.

Figure 3:
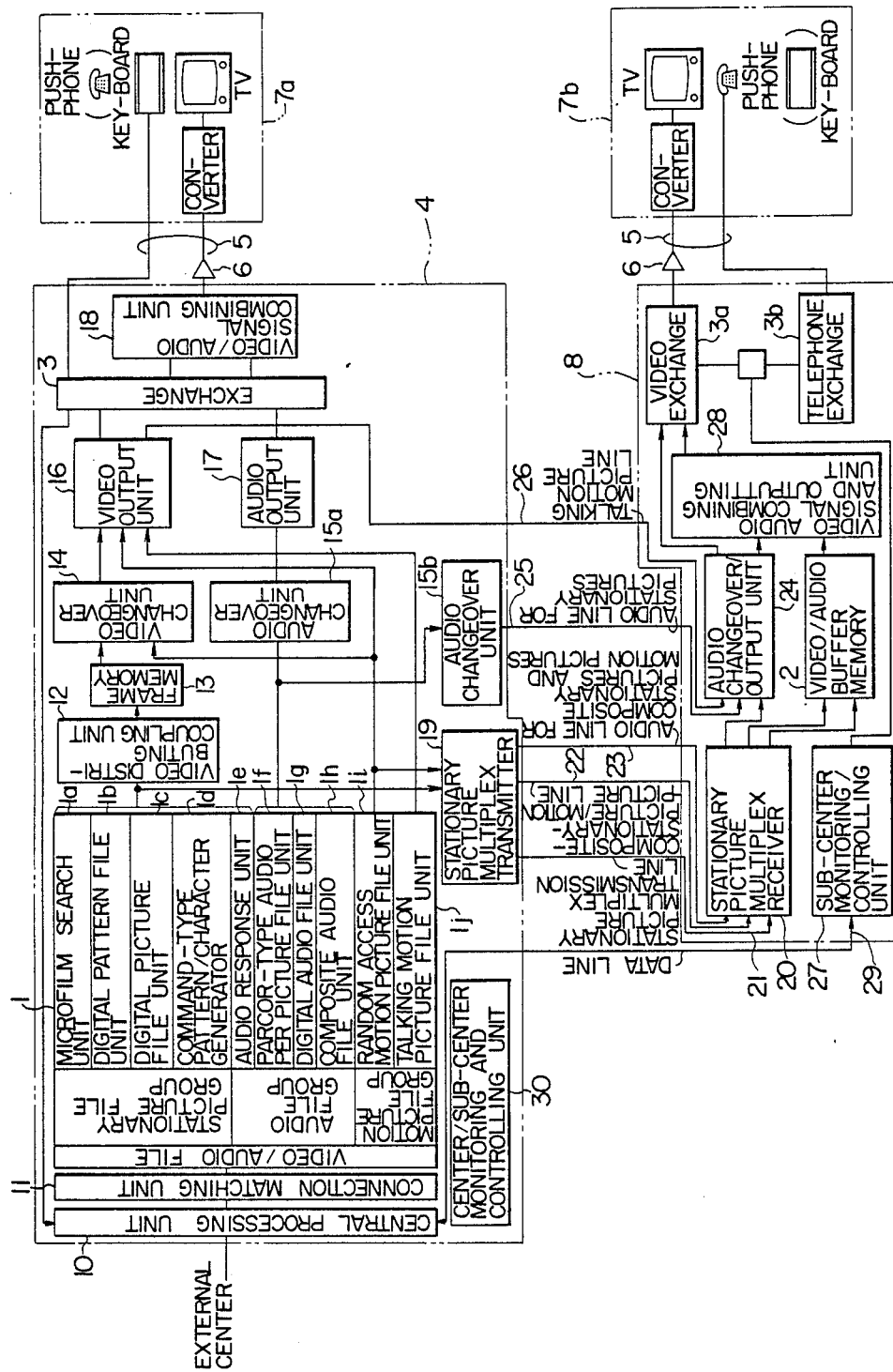
FIG. 3 shows a detailed circuit arrangement of another embodiment of a video/audio transmission network including one sub-center according to the present invention.

FIG. 3 shows a detailed circuit arrangement of the embodiment shown in FIG. 2. In FIG. 3, reference numeral 10 denotes a central processing unit 10 for controlling the system, and 11 a connection matching unit for connecting and matching the central processing unit 10 to a video/audio file unit 1. The video/audio file unit 1 is made up of a video file group for stationary pictures, an audio file group and a video file group for motion pictures. The video file group for stationary pictures includes a microfilm search unit 1a, a digital pattern file unit 1b, a digital picture file unit 1c and a command-type pattern/character generator 1d. The audio file group includes an audio response unit 1e, a PARCOR-type audio per picture file unit 1f, a digital audio file unit 1g and a composite audio file unit 1h. The video file group for motion pictures includes a random access motion picture file unit 1i and a talking motion picture file unit 1j. The video file group for stationary pictures is connected to a frame memory 13 through a video distributing/coupling unit 12. The audio file group is connected to an audio output unit 17 through an audio changeover unit 15a. Both the frame memory 13 and the random access motion picture file unit 1i are connected to a video output unit 1b through a video changeover unit 14. Further, the random access motion picture file unit 1i and the talking motion picture file unit 1j are both connected directly to the video output unit 16. The video output unit 16 and the audio output unit 17 are both connected to a video/audio signal combining unit 18 through a six-wire system exchange 3, and then connected to a subscriber junction line 5. Further, the video file group for stationary pictures and the random access motion picture file unit 1i are connected to a stationary picture multiplex transmitter 19, and the audio file group is connected to an audio changeover unit 15b.

The center 4 having such a construction as above is connected not only to the sub-centers but also to a subscriber terminal 7a which is placed relatively near to the center. In more detail, the terminal 7a is connected to the exchange 3 of the center 4 through the video/audio signal combining unit 18, the subscriber's junction line 5 and a repeater 6, but a subscriber terminal 7b which is located far from the center 4, is connected to the center 4 through the sub-center 8.

The sub-center 8 is connected to the center 4 in the following manner: a stationary picture multiplex receiver 20 of the sub-center 8 is connected to the stationary picture multiplex transmitted 19 by means of a stationary picture multiplex transmission line 21, a composite-stationary-picture/motion-picture line 22 and an audio line for composite stationary pictures and motion pictures 23, an audio changeover/output unit 24 of the sub-center 8 is connected to the audio changeover unit 15b by an audio line for stationary pictures 25, the audio changeover/output unit 25 is further connected to the video output unit 16 by a talking motion picture line 26, and a sub-center monitoring/controlling unit 27 of the sub-center 8 is connected to the central processing unit 10 by a data line 29.

The center 4 having such a construction as above is connected not only to the sub-centers but also to a subscriber terminal 7a which is placed relatively near to the center. In more detail, the terminal 7a is connected to the exchange 3 of the center 4 through the video/audio signal combining unit 18, the subscriber's junction line 5 and a repeater 6, but a subscriber terminal 7b which is located far from the center 4 is connected to the center 4 through the sub-center 8.

Further, the sub-center 8 has the circuit construction as described below. The stationary picture multiplex receiver 20 is connected to an audio changeover/output unit 24 and a video/audio buffer memory 2, both of which are connected to a video/audio signal combining and outputting unit 28. The sub-center monitoring/controlling unit 27 is connected through a control switch 40 to a video exchange 3a for changing over video receivers and to a telephone exchange 3b for changing over push-phones or key-boards. Both of the audio changeover/output unit 24 and the video/audio signal combining and outputting unit 28 are connected to the video exchange 3a. Incidentally, reference numeral 30 designates a center/sub-center monitoring and controlling unit.

Next, explanation will be made on a service requesting procedure in the case where the subscriber terminal requires an information service from the video/audio file.

In the subscriber terminal 7a which is located near to the center 4, the power source of the television receiver 73 is first checked, as is shown in FIG. 4. The receiver 73 which has been turned off, is turned on, and an idle channel is selected. Next, the key-board is turned on, or the push-phone is put in the off-hook state, and the center 4 is called through dialing. In the subscriber terminal, a desired stationary picture is selected by means of the push-button or the key-board when the subscriber terminal receives a dial tone which the center 4 transmits after the detection of calling. In the exchange 3, the presence or absence of an idle trunk is detected. When the idle trunk is absent, a busy tone is sent to the subscriber terminal, but when the idle trunk is present, it is judged whether the service is stopped or not. When the service is stopped, a talking message for reporting the stoppage of service is sent to the subscriber terminal. When the service is not stopped, a predetermined circuit connection is conducted. That is, in the center 4, a title (or index) for file information is sent out after the detection of an incoming signal, and it is checked by the subscriber terminal, and then the file information required or requested by the subscriber terminal can be sent to the subscriber terminal.

In the above sending operation, video and audio signals are sent through the video and audio output units 16 and 17 and the exchange 3 to the video/audio signal combining unit 18 in which a carrier of 4.5 MHz is frequency-modulated by the audio signal and then are superposed on the video signal (base band signal). The signal thus formed is sent to the subscriber terminal 7a through the subscriber's junction line 5. In the subscriber terminal 7a, the above signal is converted by a converter into a video signal of the NTSC system (or PAL system), and then is received by the television receiver.

In the case where the center 4 has completed the above sending operation, when the subscriber terminal 7a receives the busy tone because of the absence of idle trunk, or when the terminal 7a receives the talky message for reporting the stoppage of service, the key-board is turned off or the push-phone is put in the on-hook state, and the exchange 3 disconnects the circuit after the detection of on-hook signal. Thus, the service terminates.

Next, explanation will be made of the case where an information service is required by the subscriber terminal 7b connected to the exchanges 3a and 3b of the sub-center 8, with reference to FIG. 5. The service procedure from the start to the judgment in the exchange 3b as to whether the service is stopped or not, is the same as has been explained in connection with the subscriber terminal 7b. When the service is not stopped, the sub-center monitoring/controlling unit 27 sends out a signal for starting the center 4. Upon receipt of the above signal, the center 4 sends out a signal indicating that the center is ready to receive, and takes in the subscriber's number from the sub-center 8. Subsequently, a title (or index) is sent out, and then video and audio signals required by the subscriber terminal 7b are sent to the stationary picture receiver 20 and an audio changeover/output unit 24 through two separate junction lines. The audio signal is superposed on the video signal in the same manner as the case where video and audio signals are sent from the center 4 to the subscriber terminal 7a.

The video and audio signals are time-divisionally transmitted from the center 4 to the sub-center 8 by a plurality of lines. These lines are spatially divided into two groups, one of which is used to transmit a stationary picture, a composite stationary picture, motion picture and a talking motion picture, and the other group is used to transmit audio signals with respect to the composite stationary picture, motion picture and stationary picture.

As has been described hereinbefore, according to the present invention, since the subscriber's junction line for connecting a subscriber terminal to an exchange can be made shorter in length, the number of repeaters is reduced and therefore the cost of the whole system can be reduced.

What is claimed is:

1. A buffer memory dispersion type video/audio transmission system with spatially and timewise divided interoffice junction lines comprising:
   a center comprising:
      a group of audio files for storing audio information;
      a group of video files for storing video information;
      means for fetching specific information from said audio and video file groups in response to an information request received at said center from a subscriber terminal unit and for dividing fetched video information into a luminance signal and a chrominance signal; and
      means for transmitting said luminance signal with a superimposing signal in a time-divisional fashion by a first junction line and for transmitting said chrominance signal with an audio signal based on fetched audio information in a time-divisional fashion by a second junction line; and
   a plurality of subcenters comprising:
      a multiplex receiver for receiving said transmitted signals from said first and second junction lines;
      video and audio buffer memories for temporarily storing video and audio information received by said multiplex receiver from said first and second junction lines; and
      an audio output unit and a video output unit and an audio changeover unit and a video changeover unit for coupling said temporarily stored video and audio information to said subscriber terminal units.

2. A video/audio transmission system according to claim 1, wherein, in said center, a video signal taken out of a video file group for stationary pictures is transmitted to a video/audio signal combining unit through a video distributing/coupling unit, a frame memory, a video changeover unit, a video output unit and an exchange, and an audio signal taken out of an audio file group is transmitted to said video/audio signal combining unit through an audio changeover unit, an audio output unit and said exchange, and wherein said video and audio signals thus transmitted are combined by said video/audio signal combining unit, and then are sent to a subscriber terminal which is connected to said center without an intervening sub-center.

3. A video/audio transmission system according to claim 1, wherein a video signal which has been sent from said center to said sub-center through junction lines for connecting said center and said sub-center, is written in said buffer memory of said sub-center, wherein an audio signal which has been sent from said center to said sub-center through said junction lines, is combined by a video/audio signal combining unit with a video signal which has been read out of said buffer memory, and wherein said video and audio signals thus combined are sent to a subscriber terminal through said exchange of said sub-center and a subscriber's junction line.

4. A system according to claim 1, wherein said information request from said subscriber terminal to said center is passed to said center through said subcenter.

5. A system according to claim 1, wherein cables connecting said subcenters to said subscriber terminal units are much shorter in length than the length of said first and second junction lines.

6. A system according to claim 1, wherein said subscriber terminal units include converters and TV receivers for receiving said video and audio information from said subcenters.

7. A system according to claim 6, wherein said subscriber terminal units further include telephone sets and keyboards for receiving audio information from said subcenters.

8. A buffer memory dispersion type video/audio transmission system with spatially and timewise divided interoffice junction lines comprising:
   a center comprising:
      a group of audio files for storing audio information;
      a group of video files for storing video information;
      means for fetching specific information from said audio and video file groups in response to an information request received at said center from a subscriber terminal unit and for dividing fetched video information into a luminance signal and a chrominance signal; and
      means for transmitting said luminance signal with an audio signal based on said fetched audio information in a time-divisional fashion by a first junction line and for transmitting said chrominance signal with a superimposing signal in a time-divisional fashion by a second junction line; and
   a plurality of subcenters comprising:
      a multiplex receiver for receiving said transmitted signals from said first and second junction lines;
      video and audio buffer memories for temporarily storing video and audio information received by said multiplex receiver from said first and second junction lines; and
      an audio output unit and a video output unit and an audio changeover unit and a video changeover unit for coupling said temporarily stored video and audio information to said subscriber terminal units.

9. A video/audio transmission system according to claim 8, wherein, in said center, a video signal taken out of a video file group for stationary pictures is transmitted to a video/audio signal combining unit through a video distributing/coupling unit, a frame memory, a video changeover unit, a video output unit and an exchange, and an audio signal taken out of an audio file group is transmitted to said video/audio signal combining unit through an audio changeover unit, an audio output unit and said exchange, and wherein said video and audio signals thus transmitted are combined by said video/audio signal combining unit, and then are sent to a subscriber terminal which is connected to said center without an intervening subcenter.

10. A video/audio transmission system according to claim 8, wherein a video signal which has been sent from said center to said sub-center through junction lines for connecting said center and said sub-center, wherein an audio signal which has been sent from said center to said sub-center through said junction lines, is combined by a video/audio signal combining unit with a video signal which has been read out of said buffer memory, and wherein said video and audio signals thus combined are sent to a subscriber terminal through said exchange of said sub-center and a subscriber's junction line.

11. A system according to claim 8, wherein said subscriber terminal units include converters and TV receivers for receiving said video and audio information from said subcenters.

12. A system according to claim 8, wherein said subscriber terminal units further include telephone sets and keyboards for receiving audio information from said subcenters.

13. A system according to claim 8, wherein said information request from said subscriber terminal to said center is passed to said center through said subcenter.

14. A system according to claim 8, wherein cables connecting said subcenters to said subscriber terminal units are much shorter in length than the length of said first and second junction lines.

* * * * *